United States Patent
Grablowitz et al.

(10) Patent No.: US 8,513,334 B2
(45) Date of Patent: Aug. 20, 2013

(54) FUNCTIONALIZED POLYURETHANE POLYUREA DISPERSIONS

(75) Inventors: Hans Georg Grablowitz, Cologne (DE); Thomas Feller, Solingen (DE); Thomas Michaelis, Leverkusen (DE)

(73) Assignee: Bayer Materialscience AG, Leverkusen (DE)

( * ) Notice: Subject to any disclaimer, the term of this patent is extended or adjusted under 35 U.S.C. 154(b) by 219 days.

(21) Appl. No.: 13/147,254

(22) PCT Filed: Feb. 10, 2010

(86) PCT No.: PCT/EP2010/000801
§ 371 (c)(1),
(2), (4) Date: Aug. 1, 2011

(87) PCT Pub. No.: WO2010/094417
PCT Pub. Date: Aug. 26, 2010

(65) Prior Publication Data
US 2011/0288204 A1    Nov. 24, 2011

(30) Foreign Application Priority Data

Feb. 19, 2009   (EP) .................................... 09002307

(51) Int. Cl.
| | |
|---|---|
| *C08G 18/08* | (2006.01) |
| *C08G 59/50* | (2006.01) |
| *C08J 3/00* | (2006.01) |
| *C08K 3/20* | (2006.01) |
| *C08L 63/00* | (2006.01) |
| *C08L 75/00* | (2006.01) |

(52) U.S. Cl.
USPC ........... 523/415; 523/400; 523/402; 524/591; 524/839; 524/840; 524/906

(58) Field of Classification Search
USPC ................. 523/400, 402, 415; 524/591, 839, 524/840, 906
See application file for complete search history.

(56) References Cited

U.S. PATENT DOCUMENTS

| | | | |
|---|---|---|---|
| 4,749,743 | A | 6/1988 | Ambrose et al. |
| 5,401,949 | A | 3/1995 | Ziemacki et al. |
| 5,682,030 | A | 10/1997 | Kubon |
| 6,677,400 | B2 | 1/2004 | Munzmay et al. |
| 2007/0119943 | A1 | 5/2007 | Madej |

FOREIGN PATENT DOCUMENTS

| | | |
|---|---|---|
| EP | 1 283 230 | 2/2003 |
| JP | 5-320556 | 12/1993 |

OTHER PUBLICATIONS

International Search Report of PCT/EP2010/000801 Dated Jul. 7, 2010.
Written Opinion of PCT/EP2010/000801.
International Search Report of PCT/EP2010/000801 Mailed Mar. 15, 2010.

*Primary Examiner* — Patrick Niland
(74) *Attorney, Agent, or Firm* — Baker Donelson Bearman Caldwell & Berkowitz, PC

(57) ABSTRACT

The present invention relates to aqueous polyurethane urea dispersions having integral functional groups and coating agents produced therefrom, to a method for the production thereof, and to the use thereof for producing coating agents.

12 Claims, No Drawings

FUNCTIONALIZED POLYURETHANE POLYUREA DISPERSIONS

CROSS REFERENCE TO RELATED APPLICATIONS

This application is a §371 National Stage Application of PCT/EP2010/000801 filed Feb. 10, 2010, which claims priority to European Application No. 09002307.8 filed Feb. 19, 2009.

BACKGROUND OF THE INVENTION

1. Field of the Invention

The present invention relates to aqueous polyurethane urea dispersions having integral functional groups and to coating compositions prepared therefrom, to a process for their preparation, and to their use in the preparation of coating compositions.

2. Description of Related Art

Coating compositions based on polyurethanes play a major role because of their excellent properties, such as, for example, high scratch resistance and low-temperature flexibility. Because of increasing ecological and other legal requirements, the solvent-free, aqueous polyurethanes are particularly important. Coatings based on polyurethane dispersions are used in various applications, such as, for example, the coating of textiles, the lacquering of plastics and motor vehicles or the coating of glass fibres.

Functionalised polymers for coatings generally provide the possibility of carrying out polymer-analogous reactions in a further process step in order to improve the properties of the coating. Attempts are frequently made to achieve a high molar mass, because a high molar mass generally has a positive effect on the final properties of the coating, such as, for example, solvent stability and hydrolytic stability.

U.S. Pat. No. 7,393,894 describes self-crosslinking polyurethane dispersions in which carbonyl-containing isocyanate-reactive compounds are used as structural components which, on drying, react with subsequently added crosslinkers such as, for example, dihydrazides and diamines. A disadvantage here is that a further component for crosslinking must be added in order to achieve the desired properties such as hydrolytic stability.

U.S. Pat. No. 6,462,127 describes fatty-acid-modified polyurethane dispersions which crosslink by the influence of oxygen (oxidative drying). A disadvantage of these systems is that crosslinking takes place comparatively slowly in a period of up to seven days.

U.S. Pat. No. 6,586,523 describes self-crosslinking polyurethane dispersions which consist of hydroxy-group-functional polyurethanes in which some of the isocyanate groups are blocked. A disadvantage of the polymers described therein is that the blocking agent is freed using elevated temperatures, which is undesirable from the point of view of work hygiene.

SUMMARY OF THE INVENTION

Accordingly, the object of the present invention was to provide self-crosslinking, aqueous polyurethane urea dispersions which can be processed into coatings having very good hydrolytic stability.

Surprisingly, it has been found that epoxy-functional polyurethane polyureas crosslink thermally without the addition of further compounds (one-component (1K) system) or can be crosslinked by the addition of polyfunctional crosslinkers such as polyamines and/or polyisocyanates (two-component (2K) system). Furthermore, the coating compositions prepared from the polyurethane polyurea dispersions according to the invention exhibit excellent hydrolytic stability.

The present invention accordingly provides aqueous polyurethane polyurea dispersions, characterised in that they contain structural units of the general formula (I)

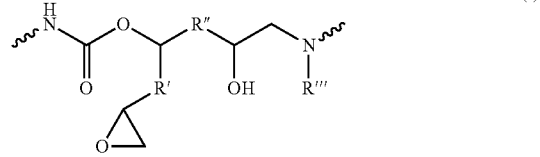

in which
R'=(CH$_2$)$_n$O and (CH$_2$)$_n$, wherein n=1-10 and n=integer,
R"=(CH$_2$)$_n$O and (CH$_2$)$_n$, wherein n=1-10 and n=integer,
R'''=H, CH$_2$CH$_2$SO$_3^-$, CH$_3$, CH$_2$CH$_3$, cyclohexyl, CH$_2$CH$_2$OH.

DETAILED DESCRIPTION OF A PREFERRED EMBODIMENT

The polyurethane urea dispersions according to the invention contain as structural components
a) one or more polyisocyanate compounds having a functionality $\geq 2$,
b) one or more polyhydroxy compounds having a molar mass M$_n$ of from 400 to 8000 g/mol and a functionality of from 1.5 to 6,
c) optionally one or more polyhydroxy compounds having a molar mass <400 g/mol and a functionality of from 2 to 4,
d) one or more non-ionic, isocyanate-reactive hydrophilising agents,
e) one or more isocyanate-reactive, potentially ionic hydrophilising agents,
f) one or more polyamines having a molar mass of from 32 to 400 g/mol and a functionality of from 1 to 3, and
g) one or more isocyanate-reactive polyepoxide compounds having an epoxide functionality $\geq 2$.

The polyurethane urea dispersions according to the invention contain
from 5 to 40 wt. %, preferably from 10 to 35 wt. %, particularly preferably from 15 to 25 wt. %, component a),
from 20 to 88.4 wt. %, preferably from 31 to 81 wt. %, particularly preferably from 46 to 73 wt. %, component b),
optionally from 0 to 5 wt. %, preferably from 0.5 to 4.0 wt. %, particularly preferably from 1 to 3 wt. %, component c),
from 1 to 5 wt. %, preferably from 1.5 to 4.5 wt. %, particularly preferably from 2 to 4 wt. %, component d),
from 0.1 to 5 wt. %, preferably from 0.5 to 4 wt. %, particularly preferably from 1 to 3 wt. %, component e),
from 5 to 10 wt. %, preferably from 5.5 to 9.5 wt. %, particularly preferably from 6 to 9 wt. %, component f), and
from 0.5 to 15 wt. %, preferably from 1 to 12 wt. %, particularly preferably from 2 to 10 wt. %, component g).

Suitable polyisocyanates a) are the aromatic, araliphatic, aliphatic or cycloaliphatic polyisocyanates known per se to the person skilled in the art. Suitable polyisocyanates a) are, for example, 1,4-butylene diisocyanate, 1,6-hexamethylene diisocyanate (HDI), isophorone diisocyanate (IPDI), 2,2,4- and/or 2,4,4-trimethyl-hexamethylene diisocyanate, the isomeric bis-(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate or hydrogenated 2,4- and/or 2,6-toluene diisocyanate, 1,5-naphthalene diisocyanate, 2,4'- and/or 4,4'-diphenylmethane diisocyanate, 1,3- and 1,4-bis-(2-isocyanato-prop-2-yl)-benzene (TMXDI), 1,3-bis(isocyanato-methyl)benzene (XDI), (S)-alkyl 2,6-diisocyanato-hexanoates or (L)-alkyl 2,6-diisocyanatohexanoates.

Polyisocyanates having a functionality >2 can also be used proportionately. Such polyisocyanates include modified diisocyanates having a uretdione, isocyanurate, urethane, allophanate, biuret, iminooxadiazinedione and/or oxadiazinetrione structure, as well as unmodified polyisocyanates having more than 2 NCO groups per molecule, for example 4-isocyanatomethyl-1,8-octane diisocyanate (nonane triisocyanate) or triphenylmethane-4,4',4''-triisocyanate.

Preference is given to polyisocyanates or polyisocyanate mixtures of the above-mentioned type containing only aliphatically and/or cycloaliphatically bonded isocyanate groups having a mean functionality of from 2 to 4, preferably from 2 to 2.6 and particularly preferably from 2 to 2.4.

Polymeric polyols which can be used as compounds b) have a molecular weight $M_n$ of from 400 to 8000 g/mol, preferably from 400 to 6000 g/mol and particularly preferably from 500 to 3000 g/mol. Their hydroxyl number is from 22 to 400 mg KOH/g, preferably from 30 to 300 mg KOH/g and particularly preferably from 40 to 250 mg KOH/g, and they have an OH functionality of from 1.5 to 6, preferably from 1.8 to 3 and particularly preferably from 1.9 to 2.1.

Polyols b) within the scope of the present invention are the organic polyhydroxyl compounds known in polyurethane coatings technology, such as, for example, the conventional polyester polyols, polyacrylate polyols, polyurethane polyols, polycarbonate polyols, polyether polyols, polyester polyacrylate polyols as well as polyurethane polyacrylate polyols, polyurethane polyester polyols, polyurethane polyether polyols, polyurethane polycarbonate polyols, polyester polycarbonate polyols, phenol/formaldehyde resins, on their own or in mixtures. Polyester polyols, polyether polyols or polycarbonate polyols are preferred, and polyester polyols are particularly preferred.

There may be mentioned as polyether polyols, for example, the polyaddition products of the styrene oxides, of ethylene oxide, propylene oxide, tetrahydrofuran, butylene oxide, epichlorohydrin, as well as their mixed-addition and graft products, as well as the polyether polyols obtained by condensation of polyhydric alcohols or mixtures thereof and those obtained by alkoxylation of polyhydric alcohols, amines and amino alcohols.

Suitable hydroxy-functional polyethers have OH functionalities from 1.5 to 6.0, preferably from 1.8 to 3.0, OH numbers from 50 to 700 mg KOH/g solid, preferably from 100 to 600 mg KOH/g solid, and molecular weights $M_n$, from 400 to 4000 g/mol, preferably from 400 to 3500 g/mol, such as, for example, alkoxylation products of hydroxy-functional starter molecules, such as ethylene glycol, propylene glycol, butanediol, hexanediol, trimethylolpropane, glycerol, pentaerythritol, sorbitol or mixtures of these and also of other hydroxy-functional compounds, with propylene oxide or butylene oxide. Polypropylene oxide polyols and polytetramethylene oxide polyols having a molecular weight of from 400 to 4000 g/mol are preferred as the polyether component b). The particularly low molecular weight polyether polyols can be water-soluble at correspondingly high OH contents. However, particular preference is given to water-insoluble polypropylene oxide polyols and polytetramethylene oxide polyols having a molar weight of from 500 to 3000 g/mol and mixtures thereof.

Highly suitable examples of polyester polyols b) are the known polycondensation products of di- as well as optionally tri- and tetra-ols and di- as well as optionally tri- and tetra-carboxylic acids or hydroxycarboxylic acids or lactones. Instead of the free polycarboxylic acids it is also possible to use the corresponding polycarboxylic acid anhydrides or corresponding polycarboxylic acid esters of lower alcohols to prepare the polyesters. Examples of suitable diols are ethylene glycol, butylene glycol, diethylene glycol, triethylene glycol, polyalkylene glycols such as polyethylene glycol, further 1,2-propanediol, 1,3-propanediol, 1,3-butanediol, 1,4-butanediol, 1,6-hexanediol and isomers, neopentyl glycol or hydroxypivalic acid neopentyl glycol ester, the last-mentioned three compounds being preferred. In order to achieve a functionality >2, polyols having a functionality of 3 can optionally be used proportionately, for example trimethylolpropane, glycerol, erythritol, pentaerythritol, trimethylolbenzene or trishydroxyethyl isocyanurate.

Suitable dicarboxylic acids are, for example, phthalic acid, isophthalic acid, terephthalic acid, tetrahydrophthalic acid, hexahydrophthalic acid, cyclohexane-dicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. Anhydrides of those acids can likewise be used, where they exist. For the purposes of the present invention, the anhydrides are consequently included in the expression "acid". Monocarboxylic acids, such as benzoic acid and hexanecarboxylic acid, can also be used, provided that the mean functionality of the polyol is $\geq 2$. Saturated aliphatic or aromatic acids are preferred, such as adipic acid or isophthalic acid. Trimellitic acid may be mentioned here as a polycarboxylic acid which can optionally be used concomitantly in smaller amounts.

Hydroxycarboxylic acids which can be used concomitantly as reactants in the preparation of a polyester polyol having terminal hydroxyl groups are, for example, hydroxycaproic acid, hydroxybutyric acid, hydroxydecanoic acid, hydroxystearic acid and the like. Suitable lactones are, for example, s-caprolactone, butyrolactone and their homologues.

Preference is given to polyester polyols b) based on butanediol and/or neopentyl glycol and/or hexanediol and/or ethylene glycol and/or diethylene glycol with adipic acid and/or phthalic acid and/or isophthalic acid. Particular preference is given to polyester polyols b) based on butanediol and/or neopentyl glycol and/or hexanediol with adipic acid and/or phthalic acid.

The polycarbonate polyols that are suitable are obtainable by reaction of carbonic acid derivatives, for example diphenyl carbonate, dimethyl carbonate or phosgene, with diols. Suitable diols are, for example, ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, but also lactone-modified diols. Preferably, the diol component contains from 40 to 100 wt. % 1,6-hexanediol and/or hexanediol derivatives, preferably those which contain ether or ester groups in addition to terminal OH groups, for example products which are obtained by reaction of 1 mol of hexanediol with at least 1 mol, preferably from 1 to 2 mol, of ε-caprolactone or by etherification of hexanediol with itself to faun di- or tri-hexylene glycol. Polyether polycarbonate polyols can also be used.

Preference is given to polycarbonate polyols b) based on dimethyl carbonate and hexanediol and/or butanediol and/or ε-caprolactone. Most particular preference is given to polycarbonate polyols based on dimethyl carbonate and hexanediol and/or ε-caprolactone.

Overall, however, polyester polyols are particularly preferred as component b).

The low molecular weight polyols c) which can optionally be used to form the polyurethane resins generally cause a stiffening and/or branching of the polymer chain. The molecular weight is preferably from 62 to 200 and their functionality is preferably from 2 to 3. Suitable polyols c) can contain aliphatic, alicyclic or aromatic groups. Mention may be made here of, for example, the low molecular weight polyols having up to about 20 carbon atoms per molecule, such as, for example, ethylene glycol, diethylene glycol, triethylene glycol, 1,2-propanediol, 1,3-propanediol, 1,4-butanediol, 1,3-butylene glycol, cyclohexanediol, 1,4-cyclohexane-dimethanol, 1,6-hexanediol, hydroquinone dihydroxyethyl ether, bisphenol A (2,2-bis(4-hydroxyphenyl)propane), hydrogenated bisphenol A (2,2-bis(4-hydroxycyclohexyl)propane) and mixtures thereof, as well as trimethylolpropane, glycerol or pentaerythritol. Ester diols such as, for example, δ-hydroxybutyl-ε-hydroxy-caproic acid ester, ω-hydroxyhexyl-γ-hydroxybutyric acid ester, adipic acid (β-hydroxyethyl) ester or terephthalic acid bis(β-hydroxyethyl) ester can also be used. Preference is given to hexanediol and/or trimethylolpropane and/or butanediol. Particular preference is given to trimethylolpropane and/or butanediol.

Suitable compounds having a non-ionically hydrophilising action d) are, for example, polyoxyalkylene ethers which contain at least one hydroxy or amino group. Such polyethers contain an amount of from 30 wt. % to 100 wt. % of structural units which are derived from ethylene oxide. There are suitable linear polyethers having a functionality of from 1 to 2, as well as compounds of the general formula (I)

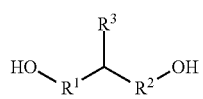

in which
$R^1$ and $R^2$ each independently of the other denotes a divalent aliphatic, cycloaliphatic or aromatic radical having from 1 to 18 carbon atoms, which can be interrupted by oxygen and/or nitrogen atoms, and
$R^3$ represents an alkoxy-terminated polyethylene oxide radical.

Compounds having a non-ionically hydrophilising action d) are, for example, also monohydric polyalkylene oxide polyether alcohols having, in the statistical mean, from 5 to 70, preferably from 7 to 55, ethylene oxide units per molecule, as are obtainable in a manner known per se by alkoxylation of suitable starter molecules (e.g. in Ullmanns Encyclopädie der technischen Chemie, 4th edition, Volume 19, Verlag Chemie, Weinheim p. 31-38).

Suitable starter molecules are, for example, saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethylcyclohexane, 3-ethyl-3-hydroxymethyloxetan or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleic alcohol, aromatic alcohols such as phenol, the isomeric cresols or methoxyphenols, araliphatic alcohols such as benzyl alcohol, anis alcohol or cinnamic alcohol, secondary monoamines such as dimethylamine, diethylamine, dipropylamine, diisopropylamine, dibutylamine, bis-(2-ethylhexyl)-amine, N-methyl- and N-ethyl-cyclohexylamine or dicyclohexylamine, as well as heterocyclic secondary amines such as morpholine, pyrrolidine, piperidine or 1H-pyrazole. Preferred starter molecules are saturated monoalcohols. Diethylene glycol monobutyl ether is particularly preferably used as the starter molecule.

Alkylene oxides suitable for the alkoxylation reaction are in particular ethylene oxide and propylene oxide, which can be used in the alkoxylation reaction in any desired sequence or alternatively in admixture.

The molar mass $M_n$ of these structural units is from 300 g/mol to 6000 g/mol, preferably from 500 g/mol to 4000 g/mol and particularly preferably from 750 g/mol to 3000 g/mol, with a functionality of 1.

Suitable non-ionically hydrophilising, monofunctional compounds d) of that type are, for example, monofunctional alkoxypolyethylene glycols such as, for example, methoxypolyethylene glycols (MPEG Carbowax® 2000 or Methoxy PEG-40, molar weight range 1800 to 2200, The Dow Chemical Company), monofunctional polyether monoalkyl ethers such as, for example, LB 25, composed of butanol and ethylene oxide as well as propylene oxide, having a mean molar mass $M_n$ of 2250 g/mol from Bayer MaterialScience, monofunctional polyether amines (Jeffamine® M 1000, PO/EO molar ratio 3/19 and M 2070, PO/EO molar ratio 10/31, Huntsman Corp.).

MPEG Carbowax® 2000, LB 25 or Jeffamine® M 2070 is preferably used as compound d). MPEG Carbowax® 2000 or LB 25 is particularly preferred.

Component e) contains potentially ionic groups, which can be either cationic or anionic in nature. Compounds having a cationically, anionically or non-ionically dispersing action are those which contain, for example, sulfonium, ammonium, phosphonium, carboxylate, sulfonate, phosphonate groups or groups which can be converted into the above-mentioned groups by salt formation (potentially ionic groups) or polyether groups, and which can be incorporated into the macromolecules by isocyanate-reactive groups that are present. Preferred suitable isocyanate-reactive groups are hydroxyl and amine groups.

Suitable ionic or potentially ionic compounds e) are, for example, mono- and di-hydroxycarboxylic acids, mono- and di-aminocarboxylic acids, mono- and di-hydroxysulfonic acids, mono- and di-aminosulfonic acids as well as mono- and di-hydroxyphosphonic acids or mono- and di-aminophosphonic acids and their salts, such as dimethylolpropionic acid, dimethylolbutyric acid, hydroxypivalic acid, N-(2-aminoethyl)-β-alanine, 2-(2-amino-ethylamino)-ethanesulfonic acid, ethylene-diamine-propyl- or -butyl-sulfonic acid, 1,2- or 1,3-propylenediamine-3-ethylsulfonic acid, malic acid, citric acid, glycolic acid, lactic acid, glycine, alanine, taurine, lysine, 3,5-diaminobenzoic acid, an addition product of IPDI and acrylic acid (EP-A 0 916 647, Example 1) and its alkali and/or ammonium salts; the adduct of sodium bisulfite with 2-butene-1,4-diol, polyether sulfonate, the propoxylated adduct of 2-butenediol and $NaHSO_3$, for example described in DE-A 2 446 440 (pages 5-9, formulae I-III), as well as structural units which can be converted into cationic groups, such as N-methyl-diethanolamine as hydrophilic structural components. Preferred ionic or potentially ionic compounds are those which have carboxy or carboxylate and/or sulfonate groups and/or ammonium groups and have a functionality of from 1.9 to 2.1. Particularly preferred ionic compounds have an amine functionality of from 1.9 to 2.1 and contain sulfonate groups as ionic or potentially ionic groups, such as the salts of N-(2-aminoethyl)-β-alanine, of 2-(2-amino-ethylamino)ethanesulfonic acid or of the addition product of IPDI and acrylic acid (EP-A 0 916 647, Example 1).

The polyamines f) used for chain extension preferably have a functionality of from 1 to 2 and are, for example, di- or poly-amines as well as hydrazides, for example ethylenediamine, 1,2- and 1,3-diaminopropane, 1,4-diaminobutane, 1,6-diaminohexane, isophoronediamine, isomer mixture of 2,2,4- and 2,4,4-trimethyl-hexamethylenediamine, 2-methyl-pentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine or adipic acid dihydrazide.

There come into consideration as component f) in principle also compounds which contain active hydrogen of different reactivity towards NCO groups, such as compounds which contain, in addition to a primary amino group, also secondary amino groups or, in addition to an amino group (primary or secondary), also OH groups. Examples thereof are primary/secondary amines, such as 3-amino-1-methyl-aminopropane, 3-amino-1-ethylaminopropane, 3-amino-1-cyclohexylaminopropane, 3-amino-1-methylaminobutane, also alkanolamines such as N-aminoethylethanol-amine, ethanolamine, 3-aminopropanol or neopentanolamine.

Preference is given to diethanolamine and/or hydrazine and/or isophoronediamine (IPDA) and/or ethylenediamine. Particular preference is given to hydrazine and/or isophoronediamine and/or ethylenediamine. Most particular preference is given to a mixture of hydrazine and IPDA.

Suitable compounds g) are isocyanate-reactive polyepoxide compounds having an epoxy functionality of from 2 to 4 and an isocyanate-reactive functionality of from 1 to 2, preferably having an epoxide functionality of from 2 to 4 and an isocyanate-reactive functionality of 1, particularly preferably having an epoxide functionality of 2 and an isocyanate-reactive functionality of 1. They include in particular hydroxy-functional polyepoxide compounds, such as, for example, glycerol diglycidyl ether, 1,4-bis(oxiran-2-yloxy) butan-2-ol, 1,5-bis(oxiran-2-ylmethoxy)pentan-2-ol, 1-(oxiran-2-ylmethoxy)-6-(oxiran-2-yloxy)hexan-2-ol, 1-(oxiran-2-ylmethoxy)-6-(oxiran-2-yloxy)heptan-2-ol, 1-(oxiran-2-ylmethoxy)-6-(oxiran-2-yloxy)octan-2-ol, 1-(oxiran-2-ylmethoxy)-6-(oxiran-2-yloxy)nonan-2-ol, 1-(oxiran-2-ylmethoxy)-6-(oxiran-2-yloxy)decan-2-ol, 1,3-di(oxiran-2-yl)propan-2-ol, 1,2:7,8-dianhydro-3,4,6-trideoxyoctitol, 1,5-di(oxiran-2-yl)pentan-3-ol, with preference being given to glycerol diglycidyl ether.

The amount of component g) to be used in the polyurethane polyurea dispersion according to the invention varies according to the application. For use in a 1K system, preferably from 0.1 to 7.0 wt. %, particularly preferably from 0.5 to 5 wt. %, are used. When used as a 2K system, preferably from 0.5 to 15 wt. %, particularly preferably from 3 to 12 wt. %, of component g) are used.

For the preparation of the PU dispersions according to the invention, any processes known from the prior art can be used, such as the prepolymer mixing process, the acetone process or the melt dispersion process. The PUR dispersion is preferably prepared by the acetone process.

The present invention also provides a process for the preparation of the aqueous polyurethane polyurea dispersions according to the invention, characterised in that a polyurethane prepolymer containing isocyanate and epoxy groups is first prepared by reaction of components a), b), c), d), e) and g) and, in a further step, the polyurethane prepolymer is chain-extended with $NH_2$- and NH-functional components e) and f) and converted into the aqueous phase.

For the preparation of the PUR dispersion by the acetone process, all or some of constituents b), c), d), e) and g), which may not contain primary or secondary amino groups, and the polyisocyanate component a) are usually placed in a reaction vessel in order to prepare an isocyanate-functional polyurethane prepolymer and optionally diluted with a solvent that is miscible with water but inert towards isocyanate groups and heated to temperatures in the range from 50 to 120° C. In order to accelerate the isocyanate addition reaction, the catalysts known in polyurethane chemistry can be used. Dibutyltin dilaurate is preferred.

Suitable solvents are the conventional aliphatic, keto-functional solvents such as, for example, acetone, butanone, which can be added not only at the beginning of the preparation but also later, optionally in portions. Acetone or butanone is preferred.

Any constituents of a) to g) not added at the beginning of the reaction are then metered in.

In the preparation of the polyurethane prepolymer, the ratio of isocyanate groups to isocyanate-reactive groups is from 1.0 to 3.5, preferably from 1.1 to 3.0, particularly preferably from 1.1 to 2.5.

The reaction of components a), b), c), d), e) and g) to give the prepolymer is carried out partially or completely, but preferably completely. Polyurethane prepolymers which contain free isocyanate and epoxide groups are thus obtained, without a solvent or in solution.

Then, in a further process step, if this has not yet been carried out or has been carried out only partially, the resulting prepolymer is dissolved with the aid of aliphatic ketones such as acetone or butanone.

Possible $NH_2$- and NH-functional components e) and f) are then reacted with the remaining isocyanate and epoxide groups. This chain extension/termination can be carried out in solvents prior to the dispersion, during the dispersion, or in water after the dispersion. The chain extension is preferably carried out prior to the dispersion in water.

If compounds corresponding to the definition of e) and f) having $NH_2$ or NH groups are used for the chain extension, the chain extension of the prepolymers is preferably carried out prior to the dispersion.

The degree of chain extension, that is to say the equivalent ratio of NCO-reactive groups of the compounds used for the chain extension to free NCO groups of the prepolymer, is from 40 to 100%, preferably from 60 to 100%, particularly preferably from 70 to 100%.

The amine components e) and f) can be used in the process according to the invention, optionally in solution in water or in a solvent, individually or in mixtures, any sequence of addition being possible in principle.

When water or organic solvents are used concomitantly as diluents, the diluent content is preferably from 70 to 95 wt. %.

The preparation of the polyurethane urea dispersion according to the invention from the prepolymers takes place following the chain extension. To that end, the dissolved and chain-extended polyurethane polymer, optionally with vigorous shear, such as, for example, vigorous stirring, is introduced into the dispersing water or, conversely, the dispersing water is stirred into the prepolymer solutions. Preferably, the water is added to the dissolved prepolymer.

The solvent still contained in the dispersions after the dispersing step is usually then removed by distillation. Removal during the dispersion is likewise possible.

The solids content of the polyurethane polyurea dispersion according to the invention is from 20 to 70 wt. %, preferably from 30 to 65 wt. % and particularly preferably from 35 to 62 wt. %.

The invention further provides the use of the polyurethane polyurea dispersions according to the invention in the preparation of coating compositions for wood, plastics, metal, glass, textiles, leather, paper and fibres, such as, for example, glass fibres, plastics fibres and graphite fibres, preferably in the production of coatings for textiles.

The dispersions according to the invention can be made to self-crosslink thermally (1K system) or can crosslink with epoxide-reactive and/or isocyanate-reactive polyfunctional compounds (2K system).

The invention provides the use of the aqueous polyurethane polyurea dispersions according to the invention in the production of thermally self-crosslinking 1K systems.

The invention likewise provides the use of the aqueous polyurethane polyurea dispersions according to the invention in the production of 2K systems.

The 2K systems containing the polyurethane polyurea dispersions according to the invention contain water-soluble or water-dispersible crosslinkers, such as hydrophilic polyisocyanates, polyamines, polyepoxides or melamines.

The aqueous coating compositions containing the polyurethane polyurea dispersions according to the invention can contain auxiliary substances and additives as a further component. Such auxiliary substances and additives can be cobinders, thickeners, adhesion promoters, lubricants, wetting additives, colourings, light stabilisers and anti-ageing agents, pigments, flow agents, antistatics, UV absorbers, film-forming aids, antifoams or plasticisers, as well as light stabilisers and anti-ageing agents.

The polyurethane polyurea dispersions according to the invention can be used as a constituent in water-based surface-coating compositions for the coating of surfaces.

For that purpose, the polyurethane polyurea dispersions according to the invention are mixed with further components such as, for example, aqueous dispersions based on polyester, polyurethane, polyurethane polyacrylate, polyacrylate, polyether, polyester polyacrylate, alkyd resin, polymer, polyamide/imide or polyepoxide.

The coating can be produced by the various spraying methods, such as, for example, compressed air, airless or electrostatic spraying methods, using one- or optionally two-component spraying systems. The lacquers and coating compositions containing the polyurethane polyurea dispersions according to the invention can, however, also be applied by other methods, for example by spread coating, roller coating, spraying, dipping, printing or doctor blade application.

EXAMPLES

Raw Materials and Methods

Desmophen® PE 170 HN: Polyester of adipic acid, hexanediol and neopentyl glycol, OH number 66, $M_n$=1700 g·mol$^{-1}$ (Bayer MaterialScience AG, Leverkusen).

Polyether LB 25: Monofunctional polyether based on ethylene oxide/propylene oxide having an ethylene oxide content of 84%, OH number 25, $M_n$=2250 g·mol$^{-1}$ (Bayer MaterialScience AG, DE).

Desmodur I: IPDI, isophorone diisocyanate (Bayer MaterialScience AG, DE).

Desmodur H: HDI, 1,6-hexamethylene diisocyanate (Bayer MaterialScience AG, DE).

IPDA: Isophoronediamine (Bayer MaterialScience AG, DE).

AAS: Diaminosulfonate, 45% in water, $H_2N-CH_2-CH_2-NH-CH_2-CH_2-SO_3Na$ (Bayer MaterialScience AG, DE).

GDGE: Glycerol diglycidyl ether, CAS [27043-36-3] (Sigma-Aldrich, DE).

Bayhydur® 3100: Hydrophilic aliphatic polyisocyanate based on 1,6-hexamethylene diisocyanate having an NCO content of 17.4% (Bayer MaterialScience AG, DE).

Imprafix® HS-C: Alkylamine (Bayer MaterialScience AG, DE).

The mechanical properties of the PU dispersions are determined on free films, which are prepared as follows:

In a film-drawing device consisting of two polished rollers the spacing of which can be set exactly, a release paper is placed in front of the rear roller. Using a feeler gauge, the spacing between the paper and the front roller is adjusted. That spacing corresponds to the film thickness (wet) of the resulting coating and can be adjusted to the desired thickness of each coat. Coating is also possible consecutively in a plurality of coats.

In order to apply the individual coats, the products, after adjustment of the viscosity to 4500 mPa·s by addition of anionic acrylic polymer, are poured into the gap between the paper and the front roller; the release paper is pulled away vertically downwards, the corresponding film forming on the paper. If a plurality of coats is to be applied, each individual coat is dried and the paper is inserted again.

Drying Conditions:
A: 3 days at room temperature (23° C.)
B: 50° C. until dry, then 3 minutes at 150° C.
C: 50° C. until dry, then 3 minutes at 150° C. and 10 minutes at 165° C.

Unless indicated otherwise, all percentages are by weight.

The solids contents were determined according to DIN-EN ISO 3251.

Unless expressly indicated otherwise, NCO contents were determined volumetrically according to DIN-EN ISO 11909.

In order to determine the degree of swelling, the free films were swollen for 24 hours in ethyl acetate at room temperature and the change in the volume of the piece of film after swelling was determined by means of a ruler.

A film having a thickness of from 0.1 to 0.2 mm was punched out in a size of 50×20 mm and stored for 2 hours in ethyl acetate at room temperature. The calculation of the volume swelling is carried out on the assumption that the change is proportional in all the dimensions.

Film storage under hydrolysis conditions is carried out according to DIN EN 12280-3. The mechanics of these film samples are determined according to DIN 53504 after 24 hours' storage under normal climatic conditions (20° C. and 65% atmospheric humidity). The mechanical film properties are determined after 30 minutes' drying at 150° C.; $s_b$ denotes ultimate elongation in %, $\sigma_{max}$ denotes tensile strength in MPa.

Preparation of the PU Dispersions According to the Invention:

Example 1

According to the Invention 37 g of HDI and 49.8 g of IPDI are added at 50° C. to 282.4 g of the polyester polyol PE 170 HN, 11.3 g of the monofunctional hydrophilising agent LB25 and 12.9 g of GDGE, and the mixture is then reacted at 100° C. to the prepolymer until the theoretical NCO value (NCO-1=5.28%) is reached. Then, at 80° C., 700 g of acetone are added, the mixture is cooled to 40° C. and the prepolymer is dissolved. 29.6 g of the chain extender IPDA in 50 g of acetone are added, and stirring is carried out for 5 minutes. Immediately thereafter, 10.5 g of AAS and 1 g of hydrazine hydrate in 42 g of water are added, and stirring is carried out likewise for 5 minutes. The product is dispersed in 600 g of water, and then the acetone is distilled off at 120 mbar and 40° C. An aqueous dispersion having a solids content of 40.0% with a pH value of 6.7 and a mean particle size of 340 nm is obtained.

Example 2

According to the Invention

The procedure of Example 1 is employed, but 241 g of the polyester PE 170 HN with 34.3 g of GDGE are used. There is formed an aqueous dispersion having a solids content of 40.2% with a pH value of 6.6 and a mean particle size of 260 nm.

Example 3

According to the Invention

The procedure of Example 1 is employed, but 217 g of the polyester PE 170 HN with 47.8 g of GDGE are used. There is formed an aqueous dispersion having a solids content of 39.2% with a pH value of 6.6 and a mean particle size of 340 nm.

COMPARISON EXAMPLES

Example 4

Counter-Example, without Isocyanate-Reactive Polyepoxide 34 g of HDI and 45 g of IPDI are added at 50° C. to 303.9 g of the polyester polyol PE 170 HN and 10.3 g of the monofunctional hydrophilising agent LB25, and the mixture is then reacted at 100° C. to the prepolymer until the theoretical NCO value (NCO=4.79%) is reached. Then, at 80° C., 700 g of acetone are added, the mixture is cooled to 40° C. and the prepolymer is dissolved. 26.8 g of the chain extender IPDA in 50 g of acetone are added, and stirring is carried out for 5 minutes. Immediately thereafter, 9.5 g of AAS and 0.9 g of hydrazine hydrate in 38 g of water are added, and stirring is carried out likewise for 5 minutes. The product is dispersed in 590 g of water, and then the acetone is distilled off at 120 mbar and 40° C. An aqueous dispersion having a solids content of 40.0% with a pH value of 6.5 and a mean particle size of 350 nm is obtained.

Example 5

Counter-Example, with Ethylhexanol Instead of Isocyanate-Reactive polyepoxide 37 g of HDI and 49.8 g of IPDI are added at 50° C. to 282.4 g of the polyester polyol PE 170 HN, 11.3 g of the monofunctional hydrophilising agent LB25 and 8.2 g of ethylhexanol, and the mixture is then reacted at 100° C. to the prepolymer until the theoretical NCO value (NCO=5.35%) is reached. Then, at 80° C., 690 g of acetone are added, the mixture is cooled to 40° C. and the prepolymer is dissolved. 29.6 g of the chain extender IPDA in 50 g of acetone are added, and stirring is carried out for 5 minutes. Immediately thereafter, 10.5 g of AAS and 1 g of hydrazine hydrate in 42 g of water are added, and stirring is carried out likewise for 5 minutes. The product is dispersed in 600 g of water, and then the acetone is distilled off at 120 mbar and 40° C. An aqueous dispersion having a solids content of 39.8% with a pH value of 6.7 and a mean particle size of 600 nm is obtained.

From the examples, the free films were prepared as described. In addition, in each case 3 wt. % of the crosslinker Bayhydur® 3100 or Imprafix® HS-C were mixed into the dispersion, with stirring, and the free films were again produced. The films were then characterised mechanically and the swelling in ethyl acetate was determined.

TABLE 1

Degrees of swelling in ethyl acetate

| | System | | | | |
|---|---|---|---|---|---|
| | 1K | | | 2K | |
| Drying | A | B | C | Amine/B | Isocyanate/B |
| Counter-example 1 | 470 | 450 | 460 | 380 | 310 |
| Counter-example 2 | run | run | run | run | 280 |
| Example 1 | 380 | 350 | 280 | 340 | 300 |
| Example 2 | 270 | 250 | 240 | 180 | 250 |
| Example 3 | 220 | 200 | 200 | 100 | 210 |

It will be seen from the degrees of swelling determined from the 1K systems that the polyurethanes according to the invention exhibit lower degrees of swelling and accordingly a higher degree of crosslinking as compared with the counter-examples. Accordingly, the dispersions exhibit a higher molar mass, even after their preparation, and can be thermally post-crosslinked, the degrees of swelling falling as the amount of polyepoxide compound increases.

It will be seen from the degrees of swelling determined from the 2K systems that the polyurethanes according to the invention are both more highly isocyanate-reactive and more highly amine-reactive, which leads to the conclusion that both expoxy and also hydroxy and amine groups must be present.

TABLE 2

Mechanical characteristics of the free films of the exemplary dispersion before and after hydrolysis after standard drying B

| | | | | Hydrolysis time | | | | | |
|---|---|---|---|---|---|---|---|---|---|
| | 0 values | | | 2 weeks | | 4 weeks | | 8 weeks | |
| Example | 100% modulus/ [MPa] | $\sigma_{max}$/ [MPa] | $\epsilon_{max}$/% | $\sigma_{max}$/ [MPa] | $\epsilon_{max}$/% | $\sigma_{max}$/ [MPa] | $\epsilon_{max}$/% | $\sigma_{max}$/ [MPa] | $\epsilon_{max}$/% |
| Example 4* | 2.7 | 41.0 | 1100 | 26.0 | 1100 | run | | run | |
| Example 5* | 2.3 | 7.0 | 250 | 2.5 | 250 | run | | run | |
| Example 1 | 3.2 | 29.0 | 850 | 42.0 | 850 | 34.0 | 900 | 25.2 | 1000 |
| Example 2 | 4.3 | 19.0 | 700 | 29.0 | 700 | 30.0 | 600 | 28.9 | 650 |
| Example 3 | 3.1 | 44.0 | 600 | 29.0 | 600 | 30.0 | 600 | 31.5 | 600 |

It is clear that the dispersions according to the invention have significantly higher hydrolytic stability, the hydrolytic stability increasing as the proportion of polyepoxide compound increases.

The invention claimed is:

1. An aqueous polyurethane polyurea dispersion, comprising structural units of formula (I)

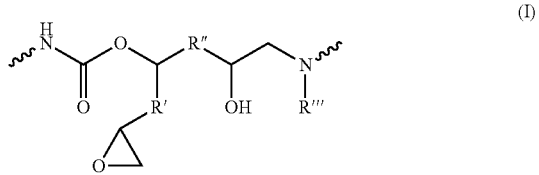

in which
R'=(CH$_2$)$_n$O and (CH$_2$)$_n$, wherein n=1 - 10 and n=integer,
R''=(CH$_2$)$_n$ O and $_{(CH2)_n}$, wherein n=1 - 10 and n=integer,
R'''=H, CH$_2$CH$_2$SO$_3^{31}$, CH$_3$, CH$_2$CH$_3$, cyclohexyl, CH$_2$CH$_2$OH.

2. Aqueous polyurethane polyurea dispersion according to claim 1, comprising as structural components
 a) one or more polyisocyanate compounds having a functionality $\geq$2,
 b) one or more polyhydroxy compounds having a molar mass $M_n$ of from 400 to 8000 g/mol and a functionality of from 1.5 to 6,
 c) optionally one or more polyhydroxy compounds having a molar mass <400 g/mol and a functionality of from 2 to 4,
 d) one or more non-ionic, isocyanate-reactive hydrophilising agents,
 e) one or more isocyanate-reactive, potentially ionic hydrophilising agents,
 f) one or more polyamines having a molar mass of from 32 to 400 g/mol and a functionality of from 1 to 3, and
 g) one or more isocyanate-reactive polyepoxide compounds having an epoxide functionality $\geq$2.

3. Aqueous polyurethane polyurea dispersion according to claim 2, characterised in that wherein component b) is polyester polyols based on butanediol and/or neopentyl glycol and/or hexanediol and/or ethylene glycol and/or diethylene glycol with adipic acid and/or phthalic acid and/or isophthalic acid.

4. Aqueous polyurethane polyurea dispersion according to claim 2, characterised in that wherein component g) has an epoxide functionality of from 2 to 4 and an isocyanate-reactive functionality of 1.

5. Aqueous polyurethane polyurea dispersion according to claim 2, characterised in that wherein component g) has an epoxide functionality of 2 and an isocyanate-reactive functionality of 1.

6. Aqueous polyurethane polyurea dispersion according to claim 2, characterised in that wherein said dispersion is capable of being used together with one or more hydrophilic polyisocyanates, polyamines, polyepoxides or melamines in a 2K system.

7. Process for the preparation of the aqueous polyurethane polyurea dispersion according to claim 1, characterised in that wherein an isocyanate- and epoxy-group-containing polyurethane prepolymer is first prepared by reaction of components a), b), c), d), e) and g) and, in a further step, the polyurethane prepolymer is chain-extended with NH$_2$- and/or NH-functional components e) and f) and converted into the aqueous phase.

8. A polyurethane polyurea dispersion according to claim 1 suitable for use in the preparation of a coating composition for wood, plastics, metal, glass, textiles, leather, paper and fibres.

9. An aqueous polyurethane polyurea dispersion according to claim 1 suitable for use in the production of thermally self-crosslinking 1K systems.

10. An aqueous polyurethane polyurea dispersion according to claim 1 suitable for use in the production of 2K systems.

11. 1K system comprising an aqueous polyurethane polyurea dispersion according to claim 1.

12. 2K system comprising aqueous polyurethane polyurea dispersion according to claim 1 and at least one water-soluble or water-dispersible crosslinker.

* * * * *